(12) United States Patent
Kim et al.

(10) Patent No.: US 6,946,534 B2
(45) Date of Patent: Sep. 20, 2005

(54) FLUORINATED POLYETHERS HAVING PERFLUORINATED ALIPHATIC GROUP AND OPTICAL WAVEGUIDE USING THE SAME

(75) Inventors: Tae Kyun Kim, Daejeon (KR); Ji Hyang Kim, Daejeon (KR)

(73) Assignee: Mi-Hwa Kim, Daejeon (KR)

( * ) Notice: Subject to any disclaimer, the term of this patent is extended or adjusted under 35 U.S.C. 154(b) by 334 days.

(21) Appl. No.: 09/964,653

(22) Filed: Sep. 28, 2001

(65) Prior Publication Data

US 2002/0057882 A1 May 16, 2002

(30) Foreign Application Priority Data

Sep. 28, 2000 (KR) ........................................ 2000-57155

(51) Int. Cl.[7] ............................................. C07C 41/22
(52) U.S. Cl. ..................... 526/247; 524/244; 526/242; 385/129; 385/143; 385/145; 430/321; 430/290
(58) Field of Search ................................ 385/129–131, 385/141–145; 526/247, 242; 524/544; 430/321, 290

(56) References Cited

U.S. PATENT DOCUMENTS

| 4,443,349 A | * | 4/1984 | Snyder et al. | .............. | 508/564 |
| 5,115,082 A | | 5/1992 | Mercer et al. | | |
| 6,306,563 B1 | * | 10/2001 | Xu et al. | ..................... | 430/321 |
| 2004/0127632 A1 | * | 7/2004 | Kim et al. | .................. | 524/544 |

FOREIGN PATENT DOCUMENTS

KR 10226442 5/1999

* cited by examiner

*Primary Examiner*—Yvette C. Thornton
(74) *Attorney, Agent, or Firm*—Greenblum & Bernstein, P.L.C.

(57) ABSTRACT

The present invention relates to fluorinated polyethers having a fluorinated aliphatic group at a main chain as represented by the formula (1), as well as a waveguide fabricated using the same:

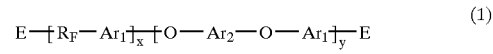

where $R_F$ represents $OCH_2(CF_2)_nCH_2O$, or $OCH_2CF_2O(CF_2CF_2O)_nCF_2CH_2O$, where n is a natural number ranging from 1 to 12;

$Ar_1$ represents

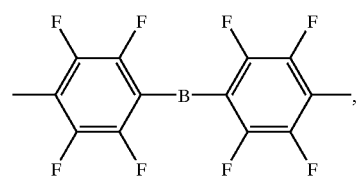

where B is not present or a C=O group, or $Ar_1$ represents

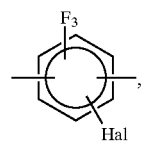

where Hal is one selected from F, Cl, Br and I; $Ar_2$ represents

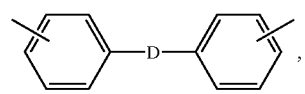

where D is one selected from —$C(CF_3)_2$, —$C(CH_3)_2$, —CO—, —$SO_2$—, —O— and —S—, or Ar₂ represents
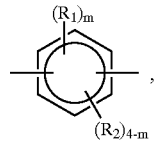
where $R_1$ and $R_2$ are the same or different and each independently represents a halogen atom selected from F, Cl, Br and I, and m is a natural number of 1–3, or
Ar₂ represents
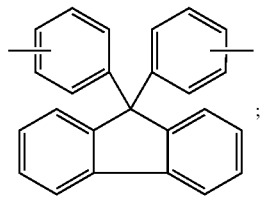
E represents H, or
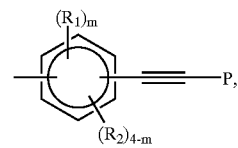
where P is H or a substituted or unsubstituted phenyl group;
x is a number ranging from 0.1 to 1.0;
y is 1.0–x.
6 Claims, 1 Drawing Sheet

FLUORINATED POLYETHERS HAVING PERFLUORINATED ALIPHATIC GROUP AND OPTICAL WAVEGUIDE USING THE SAME

BACKGROUND OF THE INVENTION

1. Field of the Invention

The present invention relates to fluorinated polyethers having low optical propagation loss, small optical birefringence, and a precious refractive index controllability, as well as a method of preparing the fluorinated polyethers and a use of the fluorinated polyethers for the fabrication of core and cladding layers of waveguide type optical devices, such as a thermo-optic switch, an optical splitter, a variable optical attenuator, a polarization splitter, tunable and fixed wavelength filters and arrayed waveguide gratings, etc.

2. Description of the Prior Art

High performance polymer materials, such as those used in planar waveguide type optical devices and optical interconnectors, require high thermal and environmental stabilities, low optical propagation loss at optical communication regions of 1.3 µm and 1.55 µm, precise refractive index controllability, adaptability to various substrates, feasibility of multi-layer thin film, dimensional flexibility, easy alignment with micro optical components, and basically cost effective technology.

Fluorinated poly(arylene ether), which were originally developed for use as low dielectric materials in semiconductor processes, have a potential applicability as an material for optical devices by virtue of its excellent thermal and mechanical characteristics and low moisture absorption (See, U.S. Pat. No. 5,115,082). However, the fluorinated poly(arylene ether) disclosed in the patent has a significantly insufficient chemical resistance and thus cannot be used for fabricating the optical devices by a multi-layer thin film fabrication process.

In an attempt to overcome the problem with the fluorinated poly(arylene ether), Korean Patent No. 226442 discloses a fluorinated poly(arylene ether) having a thermosettable acetylene end group. The polymer disclosed in this patent can provide a thin film having an excellent chemical resistance by a thermal cross-linking process and can be used applied to fabricate the optical devices. However, the fluorinated poly(arylene ether) is disadvantageous in that it is high in optical birefringence as it has an intrinsically aromatic, rigid rod-like molecular structure. Also, the aromatic fluorinated poly(arylene ether) has a refractive index of 1.50 or above at a wavelength of 1550 nm, which is significantly different from that of optical fibers (1.46). For this reason, the polymer has high reflection loss at an interconnection with the optical fibers.

SUMMARY OF THE INVENTION

The present inventors have performed intensive studies in an attempt to solve the drawbacks with the prior art, and consequently found that, where a flexible fluorinated aliphatic chain is introduced into a main chain structure of fluorinated polyethers, an optical birefringence between TE and TM modes can be reduced, a refractive index of the polyethers can be easily controlled to have a value close to 1.46 which is a refractive index of the optical fibers. It was also found that, in the case of the polyethers having the fluorinated aliphatic group, the refractive index could be precisely controlled by copolymerization of the polyethers with a selected comonomer. In addition, it was found that, by virtue of an increase in fluorine content, an optical absorption loss caused by a vibration mode of C—H bonds in the polymer structure could be reduced.

It is therefore an object of the present invention to provide fluorinated polyethers, which have a fluorinated aliphatic group at a main chain and thus exhibit low optical propagation loss, high thermal stability, low optical birefringence and precise refractive index controllability.

It is another object of the present invention to provide optical devices fabricated using the fluorinated polyethers.

To achieve the above objects, the present invention provides fluorinated polyethers having flexible aliphatic fluorinated alkyl and ethylene oxide groups at their main chain structure, as represented by the following formula (1):

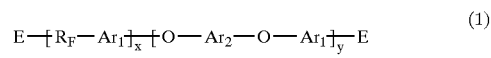

where $R_F$ represents $OCH_2(CF_2)_nCH_2O$, or $OCH_2CF_2O(CF_2CF_2O)_nCF_2CH_2O$, where n is a natural number ranging from 1 to 12;

$Ar_1$ represents

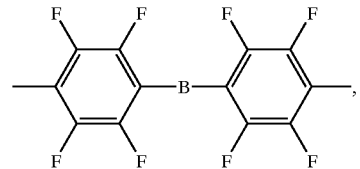

where B is not present or a C=O group, or $Ar_1$ represents

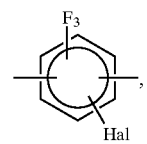

where Hal is one selected from F, Cl, Br and I;

$Ar_2$ represents

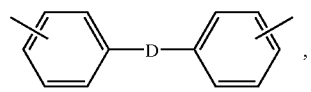

where D is one selected from $-C(CF_3)_2-$, $-C(CH_3)_2-$, $-CO-$, $-SO_2-$, $-O-$ and $-S-$, or $Ar_2$ represents

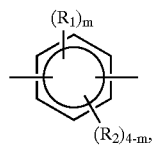

where $R_1$ and $R_2$ are the same or different and each independently represents a halogen atom selected from F, Cl, Br and I, and m is a natural number of 1–3, or Ar$_2$ represents

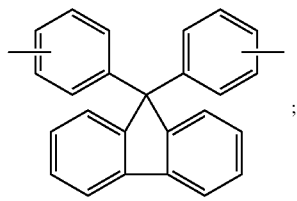

E represents H, or

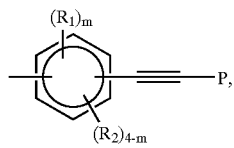

where P is H or a substituted or unsubstituted phenyl group;
x is a number ranging from 0.1 to 1.0;
y is 1.0-x.

DETAILED DESCRIPTION OF THE INVENTION

Figure 1:
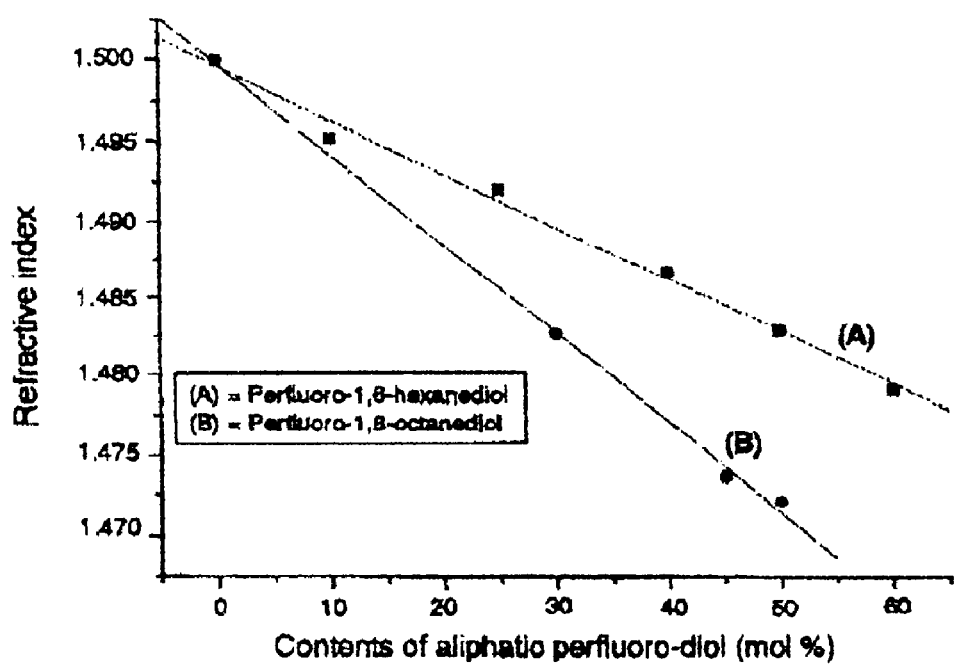
FIG. 1 shows a change in refractive index according to contents of 4,4'-(hexafluoroisopropylidene)diphenol, as a aromatic diol, and aliphatic perfluoro-diol.

The present invention relates to fluorinated polyethers having flexible aliphatic fluorinated alkyl and ethylene oxide groups at their main chain structure, as represented by the following formula (1):

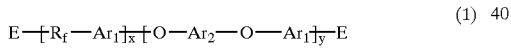 (1)

where $R_F$ represents $OCH_2(CF_2)_nCH_2O$, or $OCH_2CF_2O(CF_2CF_2O)_nCF_2CH_2O$, where n is a natural number ranging from 1 to 12;
Ar$_1$ represents

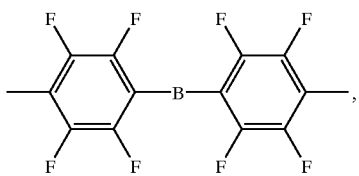

where B is not present or a C=O group, or
Ar$_1$ represents

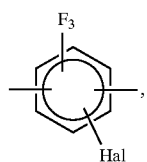

where Hal is one selected from F, Cl, Br and I;

Ar$_2$ represents

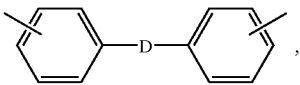

where D is one selected from —C(CF$_3$)$_2$, —C(CH$_3$)$_2$, —CO—, —SO$_2$—, —O— and —S—, or
Ar$_2$ represents

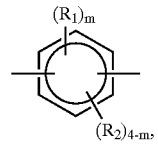

where R$_1$ and R$_2$ are the same or different and each independently represents a halogen atom selected from F, Cl, Br and I, and m is a natural number of 1–3, or
Ar$_2$ represents

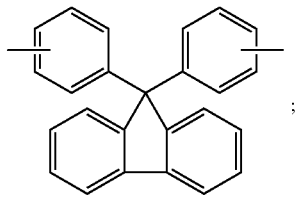

E represents H, or

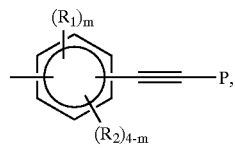

where P is H or a substituted or unsubstituted phenyl group;
x is a number ranging from 0.1 to 1.0;
y is 1.0-x.

The fluorinated polyethers represented by the formula (1) are synthesized by thermal polycondensation of decafluorobiphenyl, decafluorobenzophenone, or hexafluorobenzene with fluorinated aliphatic alkyl diol. To precisely control a refractive index and physical property, fluorinated polyether copolymers partially containing a flexible aliphatic group may also be synthesized by thermal polycondensation of decafluorobiphenyl, decafluorobenzophenone, or hexafluorobenzene with fluorinated aliphatic alkyl diol and aromatic diol having various substituents. Using the polymers or copolymers, planar waveguide polymeric optical devices can be fabricated. If necessary, a thermosettable ethynyl group can be introduced into an end of the polymer so as to improve process stability.

More specifically, the fluorinated polyethers according to the present invention are synthesized by thermal polycondensation of decafluorobiphenyl, aliphatic perfluorodiol and ethynyl phenol at a temperature of 20° C. to 180° C. in the presence of K$_2$CO$_3$. A molecular weight of the polymer is controlled to have a value ranging from 2,000 to 20,000 mol/g by changing a molar ratio of the respective components. The following reaction scheme (1) illustrates a synthetic route of the polymer according to the present invention.

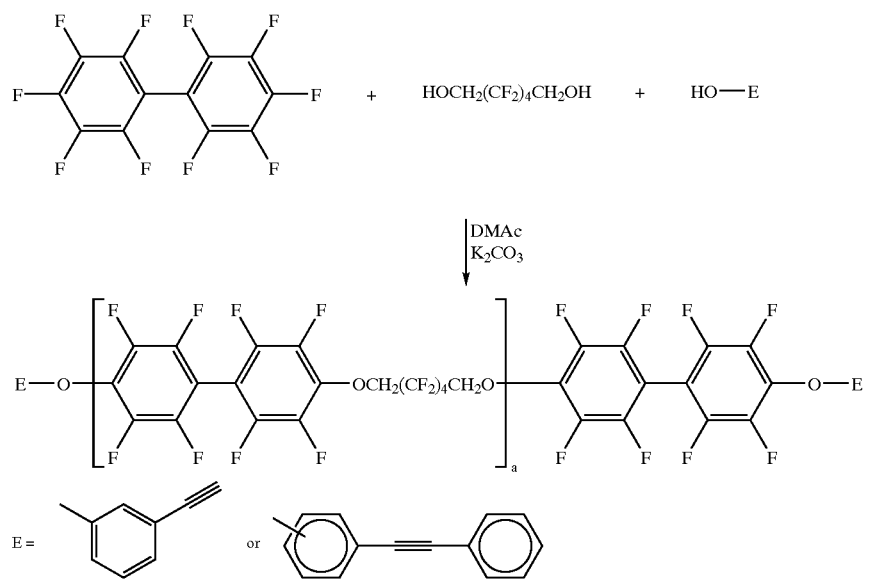
According to the synthetic route as illustrated in the reaction scheme (1), various polymer derivatives can be synthesized, which respectively have a repeat unit represented by one of the following formulas (A) to (I). These derivatives are used alone or in combinations to precisely control a refractive index of optical waveguide devices.
(A)
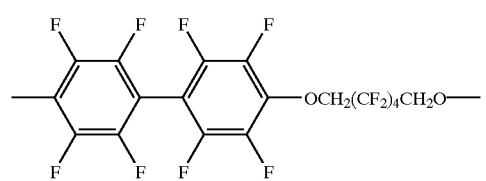
(B)
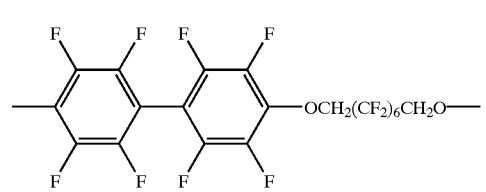
(C)
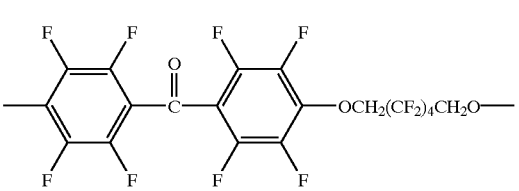
(D)
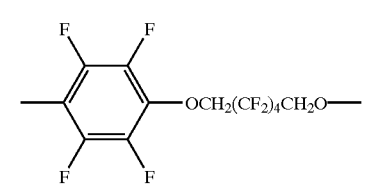
(E)
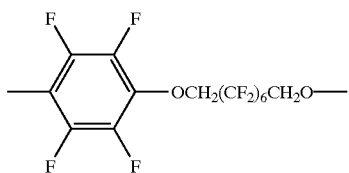
(F)
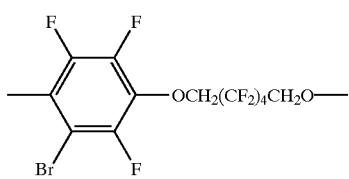
(G)
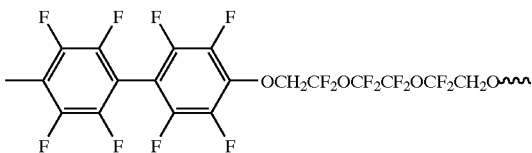
(H)
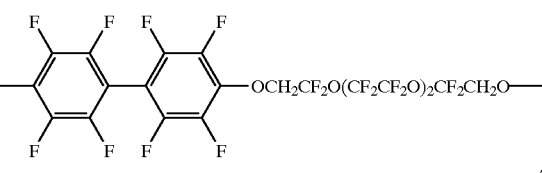
(I)
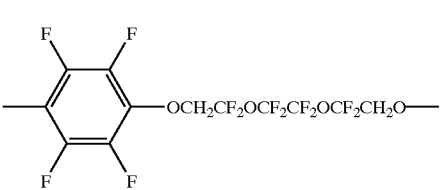

In order to precisely control thermal stability, refractive index controllability and physical property, a copolymer of decafluorobiphenyl with aliphatic perfluoro-diol and aromatic diol may also be synthesized according to the following reaction scheme (2):

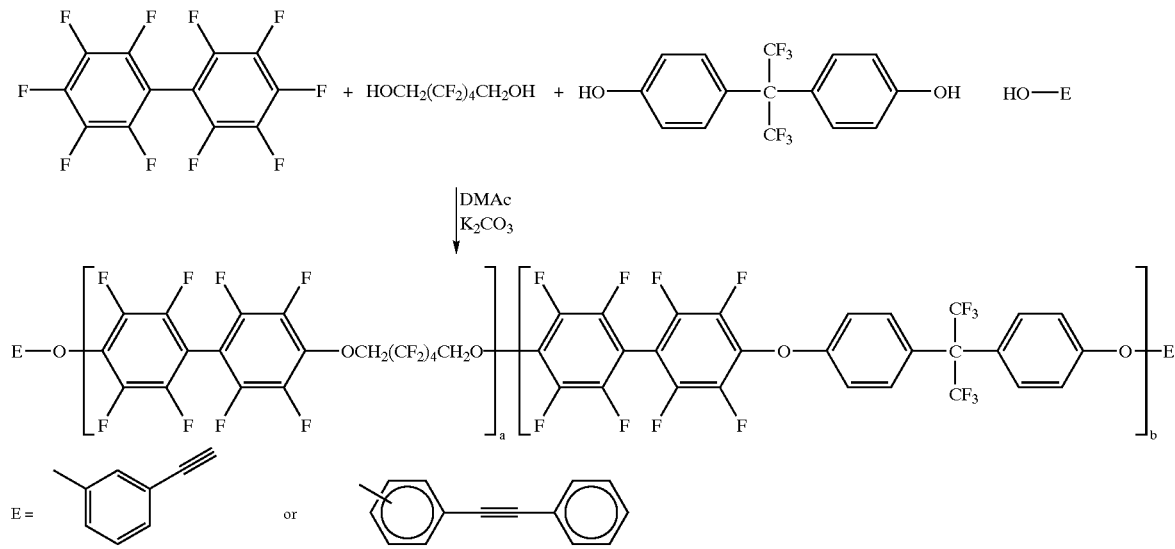

The synthesized polymer is dissolved in a suitable solvent, spin-coated on a substrate, and then subjected to a thermal treatment to obtain a polymer thin film.

FIG. 1 illustrates a change in refractive index according to contents of 4,4'-(hexafluoroisopropyliden)diphenol, an aromatic diol, and aliphatic perfluoro-diol. The refractive index change can be more preciously controlled by mixing of two copolymers.

According to the synthetic route illustrated in the reaction scheme (2), representative copolymer derivatives can be synthesized, which respectively have a repeat unit represented by one of the following formulas (Aa) to (Ga):

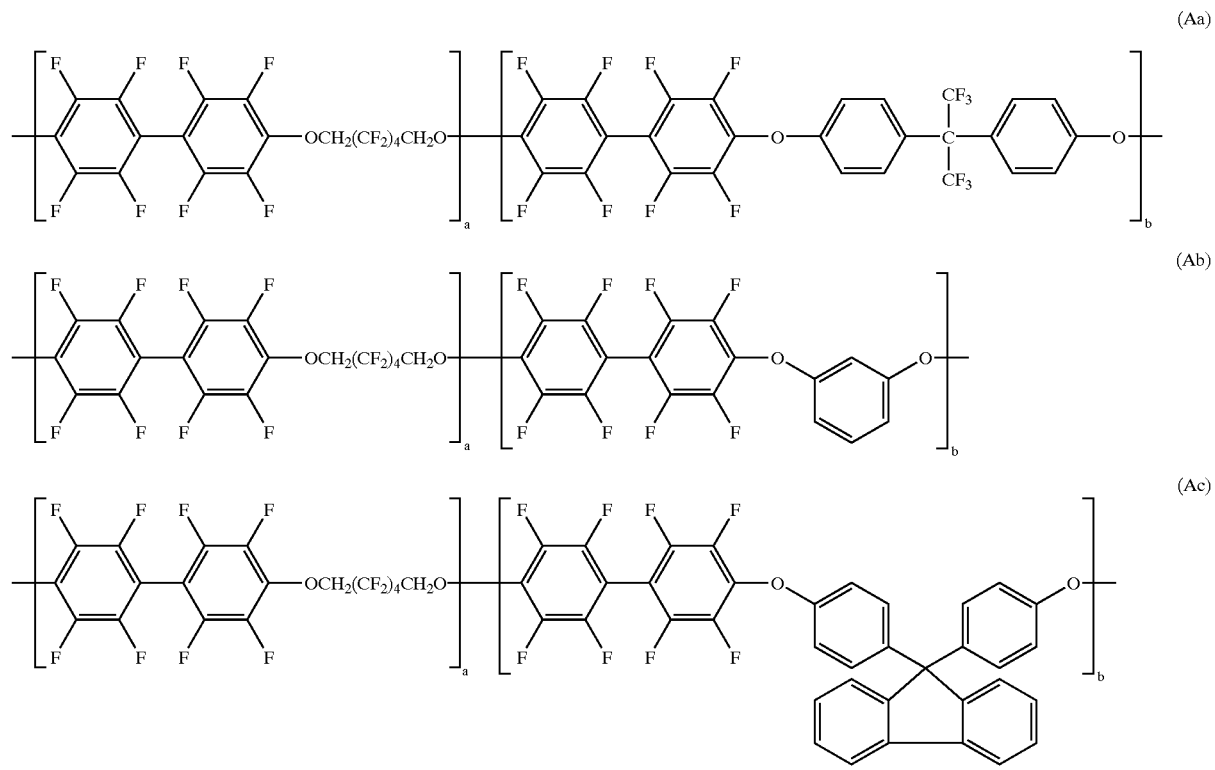

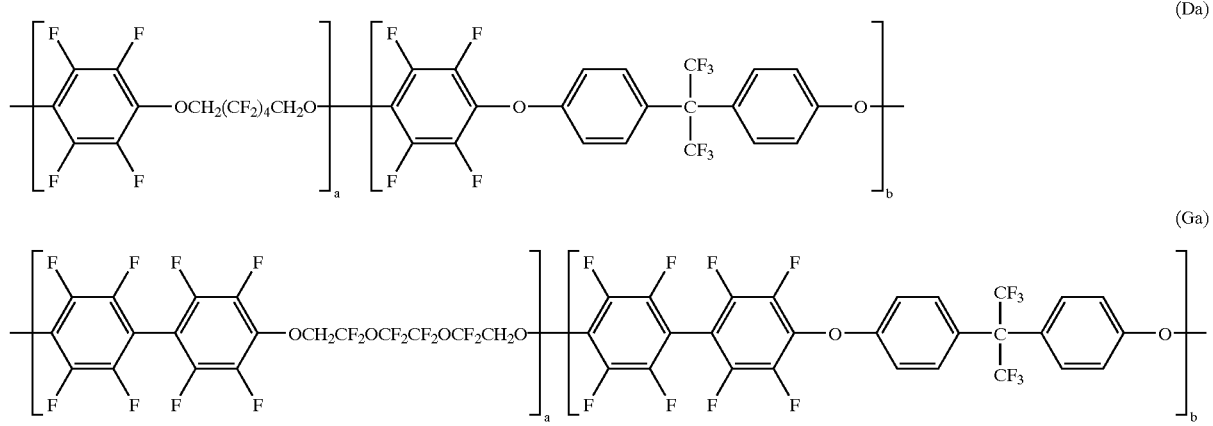

The present invention will hereinafter be described in further detail by examples. It should however be borne in mind that the present invention is not limited to or by the examples.

EXAMPLE 1

Preparation of a Polymer Having the Repeat Unit Represented by a Formula (A)

5.0 g (14.965 mmol) of decafluorobiphenyl and 3.84 g (14.965 mmol) of octafluoro-1,6-hexanediol are introduced into a 100 mL three-necked flask, and then completely dissolved in 50 mL of a DMAc solvent. 5.26 g of $K_2CO_3$ is added into the reaction flask, and the resulting mixture is heated to 80° C. under a nitrogen atmosphere and stirred for 24 hours. Then, the reaction mixture is cooled and precipitated in a mixed solution of methanol and DI water. The produced polymer is filtrated and washed continuously with water. The obtained polymer is dried in a vacuum oven at 80° C.

$^1$H-NMR (Acetone $d_6$): δ 5.04 (t, 4H, —$CH_2O$—). Mn=22,600; PDI=2.7; thermal decomposition temp. (Td)=400° C.

EXAMPLE 2

Preparation of a Polymer Having the Repeat Unit Represented by the Formula (D)

5.0 g (26.9 mmol) of hexafluorobenzene and 7.1 g (26.9 mmol) of octafluoro-1,6-hexanediol are introduced into a 100 mL three-necked flask and completely dissolved in 55 mL of a DMAc solvent. 9.6 g of $K_2CO_3$ is added into the reaction flask, and the resulting mixture is heated to 80° C. under a nitrogen atmosphere and stirred for 24 hours. Subsequently, the stirred mixture is further heated up to 120° C. and reacted for 48 hours. After this, the reaction mixture is cooled and precipitated in a mixed solution of methanol and DI water. The produced polymer is filtered and washed continuously with water. The obtained polymer is dried in a vacuum oven at 80° C. $^1$H-NMR (Acetone $d_6$): δ 4.6 (t, 4H, —$CH_2O$—). Mn=12,400; PDI=3.1; thermal decomposition temp. (Td)=380° C.

EXAMPLE 3

Preparation of Polymer Having the Repeat Unit Represented by the Formula (G)

5.0 g (14.965 mmol) of decafluorobiphenyl and 4.4 g (14.965 mmol) of perfluorotriethylene glycol are introduced into a 100 mL three-necked flask and completely dissolved in 50 mL of a DMAc solvent. 5.26 g of $K_2CO_3$ is added into the reaction flask, and the resulting mixture is heated to 80° C. under a nitrogen atmosphere and stirred for 24 hours. The reaction mixture is cooled and precipitated in a mixed solution of methanol and DI water. The produced polymer is filtered and continuously washed with water. The obtained polymer is dried in a vacuum oven at 80° C. $^1$H-NMR (Acetone $d_6$): δ 5.2 (t, 4H, —$CH_2O$—); Mn=25,300; PDI=2.0; thermal decomposition temp. (Td)=420° C.

EXAMPLE 4

Preparation of a Copolymer Having a Repeat Unit Represented by the Formula (Aa)

5.0 g (14.965 mmol) of decafluorobiphenyl, 1.9 g (7.3 mmol) of octafluoro-1,6-hexanediol and 2.47 g (7.3 mmol) of 4,4'-hexafluoroisopropylidene)diphenol (6FBPA) are introduced into a 100 mL three-necked flask and completely dissolved in 53 mL of a DMAc solvent. 5.26 g of $K_2CO_3$ is added into the reaction flask, and the resulting mixture is heated to 80° C. under a nitrogen atmosphere and stirred for 24 hours. After this, the reaction mixture is cooled and precipitated in a mixed solution of methanol and DI water. The produced polymer is filtered and washed continuously with water. The obtained polymer is dried in a vacuum oven at 80° C. $^1$H-NMR ($CDCl_3$): δ 4.76 (t, 4H), 7.03 (d, 4H), 7.4 (d, 4H); Mn=23,300; PDI=2.8; thermal decomposition temp. (Td)=400° C.

By controlling a molar ratio of octafluoro-1,6-hexanediol to 4,4'-hexafluoroisopropylidene)diphenol, copolymers which respectively have a molar ratio of 9:1, 8:2 or the like can be obtained according to the same reaction conditions as described above.

EXAMPLE 5

Preparation of a Copolymer Having a Repeat Unit Represented by the Formula (Ga)

5.0 g (14.965 mmol) of decafluorobiphenyl, 2.15 g (7.3 mmol) of perfluoro triethylene glycol and 2.47 g (7.3 mmol) of 4,4'-hexafluoroisopropylidene)diphenol (6FBPA) are introduced into a 100 mL three-necked flask and completely dissolved in 53 mL of a DMAc solvent. 5.26 g of $K_2CO_3$ is added into the reaction flask, and the resulting mixture is heated to 80° C. under a nitrogen atmosphere and stirred for 24 hours. After that, the reaction mixture is cooled and precipitated in a mixed solution of methanol/DI water. The produced polymer is filtered and washed continuously with water. The obtained polymer is dried in a vacuum oven at 80° C. $^1$H-NMR (CDCl$_3$): δ 5.2 (t, 4H), 7.03 (d, 4H), 7.4 (d, 4H). Mn=24,300, PDI=2.8, thermal decomposition temp. (Td)=400° C.

By controlling a molar ratio of perfluoro triethylene glycol to 4,4'-hexafluoroisopropylidene)diphenol, various copolymers can be obtained according to the same reaction conditions as described above.

EXAMPLE 6

Preparation of a Polymer Having a Repeat Unit Represented by the Formula (A) and a Thermosettable Ethynyl as an End Group 5.0 g (14.965 mmol) of decafluorobiphenyl and 3.55 g (13.54 mmol) of octafluoro-1,6-hexanediol are introduced into a 100 mL three-necked flask and dissolved thoroughly in 48 mL of a DMAc solvent. 5.38 g of K$_2$CO$_3$ is added into the reaction flask, and the resulting mixture is heated to 80° C. under a nitrogen atmosphere and stirred for 8 hours. 0.34 g (2.85 mmol) of 3-ethynyl phenol is then added into the flask and stirred for 16 hours at the same temperature. After that, the reaction temperature is cooled and precipitated in a mixed solution of methanol/DI water. The produced polymer is filtered and washed continuously with water. The obtained polymer is dried in a vacuum oven at 80° C. $^1$H-NMR (CDCl$_3$): δ 3.7 (s), 5.15 (t), 7.3 (m), 7.4 (d). Mn=8,200, PDI=2.2, thermal decomposition temp. (Td)= 400° C.

EXAMPLE 7

Preparation of a Polymer Having a Repeat Unit Represented by the Formula (C) and a Thermosettable Ethynyl Group as an End Group 5.0 g (13.8 mmol) of decafluorobenzophenone and 3.55 g (12.5 mmol) of octafluoro-1,6-hexanediol are introduced into a 100 mL three-necked flask and dissolved thoroughly in 47 mL of a DMAc solvent. 5.0 g of K$_2$CO$_3$ is added into the reaction flask, and the resulting mixture is heated to 80° C. under a nitrogen atmosphere and stirred for 48 hours. 0.31 g (2.6 mmol) of 3-ethynylphenol is then added into the flask and stirred for 4 hours at the same temperature. After that, the reaction mixture is cooled and precipitated in a mixed solution of methanol/DI water. The produced polymer is filtered and washed continuously with water. The obtained polymer is dried in a vacuum oven at 80° C. $^1$H-NMR (CDCl$_3$): δ 3.6 (s), 5.1 (t), 7.3 (m), 7.4 (d). Mn=5,200, PDI=2.0, thermal decomposition temp (Td)=380° C.

EXAMPLE 8

Preparation of a Polymer Having a Repeat Unit Represented by the Formula (D) and a Thermosettable Ethynyl Group as an End Group 5.0 g (26.9 mmol) of hexafluorobenzene and 6.4 g (24.3 mmol) of octafluoro-1,6-hexanediol are introduced into a 100 mL three-necked flask and dissolved thoroughly in 64 mL of a DMAc solvent. 10.0 g of K$_2$CO$_3$ is added into the reaction flask, and the resulting mixture is heated to 80° C. under a nitrogen atmosphere and stirred for 12 hours. Then, the reaction mixture is further heated up to 120° C. and left to react for 12 hours. 0.6 g (5.1 mmol) of 3-ethynylphenol is added into the flask and the resulting mixture is stirred for 4 hours at the same temperature. The reaction mixture is cooled, poured into DI water, and then extracted with ethyl ether. Very viscous liquid polymer is obtained. $^1$H-NMR (CDCl$_3$): δ 3.8 (s), 5.3 (t), 7.3 (m), 7.4 (d). Mn=4,200, PDI=2.0, thermal decomposition temp (Td)=380° C.

EXAMPLE 9

Preparation of a Polymer Having a Repeat Unit Represented by the Formula (G) and a Thermosettable Ethynyl Group as an End Group 5.0 g (14.965 mmol) of decafluorobiphenyl and 3.98 g (13.54 mmol) of perfluorotriethylene glycol are introduced into a 100 mL three-necked flask and dissolved thoroughly in 48 ml of a DMAc solvent. 5.38 g of K$_2$CO$_3$ is added into the reaction flask, and the resulting mixture is heated to 80° C. under a nitrogen atmosphere and stirred for 24 hours. 0.34 g (2.85 mmol) of 3-ethynylphenol is added into the flask and stirred for 4 hours at the same temperature. The reaction mixture is cooled and then precipitated in a mixed solution of methanol/DI water. The produced polymer is filtered and washed continuously with water. The obtained polymer is dried in a vacuum oven at 80° C. $^1$H-NMR (CDCl$_3$): δ 3.6 (s), 5.4 (t), 7.3 (m), 7.4 (d). Mn=9,200, PDI=2.5, thermal decomposition temp (Td)=400° C.

EXAMPLE 10

Preparation of a Polymer Having a Repeat Unit Represented by the Formula (Aa) and a Thermosettable Ethynyl Group as an End Group 5.0 g (14.96 mmol) of decafluorobiphenyl, 1.8 g (6.8 mmol) of octafluoro-1,6-hexanediol and 2.3 g (6.8 mmol) of 4,4'-hexafluoroisopropylidene)diphenol (6FBPA) are introduced into a 100 mL three-necked flask and dissolved thoroughly in 51 mL of a DMAc solvent. 5.26 g of K$_2$CO$_3$ is added into the reaction flask, and the resulting mixture is heated to 80° C. under a nitrogen atmosphere and stirred for 24 hours. 0.34 g (2.85 mmol) of 3-ethynylphenol is added into the flask and then stirred for 4 hours at the same temperature. After that, the reaction mixture is cooled and precipitated in a mixed solution of methanol/DI water. The resulting polymer is filtered and washed continuously with water. The obtained polymer is dried in a vacuum oven at 80° C. $^1$H-NMR (CDCl$_3$): δ 3.1 (s), 4.78 (t), 7.032 (d), 7.2 (m), 7.4 (d, 4H). Mn=37,800, PDI=2.1, thermal decomposition temp. (Td)=250° C.

By controlling a molar ratio of octafluoro-1,6-hexanediol to 4,4'-hexafluoroisopropylidene)diphenol, various copolymers can be obtained according to the same reaction conditions as described above,

EXAMPLE 11

Preparation of a Polymer Having a Repeating Unit Represented by the Formula (Ab) and a Thermosettable Ethynyl Group as an End Group 5.0 g (14.96 mmol) of decafluorobiphenyl, 1.8 g (6.8 mmol) of octafluoro-1,6-hexanediol and 0.7 g (6.8 mmol) of resorcinol are introduced into a 100 mL three-necked flask and dissolved thoroughly in 43 mL of a DMAc solvent. After 5.38 g of K$_2$CO$_3$ is added into the reaction flask, the resulting mixture is heated to 80° C. under a nitrogen atmosphere and stirred for 24 hours. Then, 0.34 g (2.85 mmol) of 3-ethynylphenol is added into the flask and stirred for 3 hours at the same temperature. After that, the resulting reaction mixture is cooled and precipitated in a mixed solution of methanol/DI water. The resulting polymer is filtered and washed continuously with water. The obtained polymer is dried in a vacuum oven at 80° C. $^1$H-NMR (CDCl$_3$): δ 3.7 (s), 5.16 (t), 7.02 (d), 7.17 (s), 7.3 (m), 7.48 (m). Mn=7,300, PDI=2.3, thermosetting temp. (Tc)=250° C., thermal decomposition temp. (Td)=405° C.

By controlling a molar ratio of octafluoro-1,6-hexanediol to resorcinol, various copolymers can be obtained according to the same reaction conditions as described above.

EXAMPLE 12

Preparation of a Polymer Having a Repeat Unit Represented by the Formula (Ac) and a Thermosettable Ethynyl Group as an End Group 5.0 g (14.96 mmol) of decafluorobiphenyl, 1.8 g (6.8 mmol) of octafluoro-1,6-hexanediol and 2.4 g (6.8 mmol) of 4,4'-(9-fluorenylidene)diphenol are introduced into a 100 ml three-necked flask and dissolved thoroughly in 52 mL of a DMAc solvent. After 5.38 g of K$_2$CO$_3$ is added into the reaction flask, the resulting mixture is heated to 80° C. under a nitrogen atmosphere and stirred for 24 hours. Then, 0.34 g (2.85 mmol) of 3-ethynylphenol is added into the flask and stirred for 3 hours at the same temperature. After that, the reaction mixture is cooled and precipitated in a mixed solution of methanol/DI water. The resulting polymer is filtered and washed continuously with water. The obtained polymer is dried in a vacuum oven at 80° C. $^1$H-NMR (CDCl$_3$): δ 3.73 (s), 5.15 (t), 7.1 (d), 7.25 (d), 7.32 (m), 7.4 (m), 7.49 (d), 7.91 (d), Mn=7,100, PDI=2.3, thermosetting temp. (Tc)=250° C., thermal decomposition temp. (Td)=405° C.

By controlling a molar ratio of octafluoro-1,6-hexanediol to 4,4'-(9-fluorenylidene)diphenol, various copolymers can be obtained according to the same reaction conditions as described above.

EXAMPLE 13

Preparation of a Polymer Having a Repeat Unit Represented by the Formula (Da) and a Thermosettable Ethynyl Group as an End Group 5.0 g (26.87 mmol) of hexafluorobenzene, 3.2 g (12.2 mmol) of octafluoro-1,6-hexanediol and 4.1 g (12.2 mmol) of 4,4'-(9-fluorenylidene)diphenol are introduced into a 100 mL three-necked flask and dissolved thoroughly in 70 mL of a DMAc solvent. After 9.6 g of K$_2$CO$_3$ is added into the reaction flask, the resulting mixture is heated to 80° C. under a nitrogen atmosphere and stirred for 24 hours. Then, 0.6 g (5.1 mmol) of 3-ethynylphenol is added into the flask and stirred for 3 hours at the same temperature. After that, the reaction mixture is cooled and precipitated in a mixed solution of methanol/DI water. The resulting polymer is filtered and washed continuously with water. The obtained polymer is dried in a vacuum oven at 80° C. $^1$H-NMR (CDCl$_3$): δ 3.7 (s), 4.94 (t), 7.1 (d), 7.2 (m), 7.41 (d). Mn=7,600, PDI=2.0, thermosetting temp. (Tc)=250° C., thermal decomposition temp. (Td)=405° C.

By controlling a molar ratio of octafluoro-1,6-hexanediol to 4,4'-(9-fluorenylidene)diphenol, various copolymers can be obtained according to the same reaction conditions as described above.

EXAMPLE 14

Preparation of a Polymer Having a Repeat Unit Represented by the Formula (Ga) and a Thermosettable Ethynyl Group as an End Group 5.0 g (14.96 mmol) of decafluorobiphenyl, 2.0 g (6.8 mmol) of perfluorotriethylene glycol and 2.3 g (6.8 mmol) of 4,4'-(hexafluoroisopropyliden)diphenol (6FBPA) are introduced into a 100 mL three-necked flask and dissolved thoroughly in 51 mL of a DMAc solvent. After 5.26 g of K$_2$CO$_3$ is added into the reaction flask, the resulting mixture is heated to 80° C. under a nitrogen atmosphere and stirred for 24 hours. Then, 0.34 g (2.85 mmol) of 3-ethynylphenol is added into the flask and stirred for 4 hours at the same temperature. After that, the resulting reaction mixture is cooled and precipitated in a mixed solution of methanol/DI water. The resulting polymer is filtered and washed continuously with water. The obtained polymer is dried in a vacuum oven at 80° C. $^1$H-NMR (CDCl$_3$) δ 3.7 (s), 5.2 (t), 7.0 (d), 7.2 (m), 7.4 (d). Mn=7,900, PDI=2.1, thermosetting temp. (Tc)=250° C., thermal decomposition temp. (Td)=405° C.

By controlling a molar ratio of perfluorotriethylene glycol to 4,4'-(hexafluoroisopropyliden)diphenol, various copolymers can be obtained according to the same reaction conditions as described as above.

EXAMPLE 15

Fabrication of a Polymer Thin Film using a Linear Polymer not Containing a Thermosettable Ethynyl Group The homopolymer or copolymer not containing a thermosettable ethynyl group as an end group, which was prepared Examples 1–5 is dissolved in a cyclohexanone solvent at a concentration of 5 to 25% by weight. The resulting solution is filtered through a 0.2 μm Teflon filter. The filtrate is spin-coated on various kinds of substrates, preferably a Si wafer substrate, at a speed of 500 to 5000 rpm, and then dried in an oven at 160° C. for 2 hours or above, thereby obtaining a polymer thin film. The polymer thin film obtained has an insufficient chemical resistance and thus is difficult to form a multi-layer thin film.

EXAMPLE 16

Fabrication of a Polymer Thin Film using a Polymer Containing a Thermosettable Ethynyl Group The homopolymer or a copolymer containing a thermosettable ethynyl group as an end group, which was prepared in Examples 6–13, is dissolved in a cyclohexanone solvent at a concentration of 10 to 50% by weight. The resulting solution is filtered through a 0.2 μm Teflon filter. The filtrate is spin-coated on various substrates, preferably a Si wafer substrate, at a speed of 500 to 5000 rpm, and then thermally cured on a hot plate under a nitrogen atmosphere for 10 minutes at 90° C., 10 minutes at 150° C. and 2 hours at 250° C., thereby obtaining a polymer thin film. The polymer thin film obtained has an excellent chemical resistance and thus is easy to fabricate optical devices using a multi-layer thin film.

EXAMPLE 17

Fabrication of Optical Devices using the Polymer According to the Present Invention As a substrate for fabricating polymer devices, Si wafer is generally provided. On the provided substrate, a SiO$_2$ layer is formed as a lower cladding layer of a waveguide, or the polymer of the present invention is coated, which has an about 0.3–1.5% lower refractive index than to that of the inventive polymer for a core layer. Formation of the thin film is carried out in the same manner as described in Example 16. On the lower cladding layer, the polymer of the present invention having a low optical propagation loss is coated as a core material of the waveguide and then thermally cured. Then, a waveguide mask for formation of the waveguide is aligned, and a waveguide pattern is formed using photolithography. Next, regions of the waveguide other than a central region of the waveguide are etched using a Reactive Ion Etching (RIE) or Inductive Coupled Plasma (ICP) process. Finally, the polymer for an upper cladding layer is coated to fabricate devices. End face of devices for input and output of light wave can be formed by a dicing and then polishing method using sawer and polisher, respectively.

As described above, the present invention can eliminate an intrinsic optical absorption of a material by replacing a C—H bond, a main cause for optical absorption, with a C—F bond. Also the present invention can minimize TE/TM birefringence by virtue of orientation independence in forming a thin film using the polymer having the fluorinated aliphatic group introduced into the polymer main chain. In addition, the present invention can precisely control the refractive index over a wide range by copolymerization, so that optical devices having an excellent performance can be fabricated in an easy manner.

The inventive polymer for use in the formation of the core and cladding layers of the waveguide has very low optical propagation loss in an optical communication region as it is highly substituted with halogen atoms. Also, the inventive polymer has the flexible fluorinated aliphatic group introduced into its main chain, so that it has a minimized birefringence and can be advantageously used for the fabrication of polarization-independent devices. Moreover, since the refractive index of the core layer of the optical devices fabricated according to the present invention approximately equals to that of an optical fiber pigtailed with the optical devices, a reflection loss at the pigtail point can be minimized. In addition, the inventive polymer is excellent in chemical resistance and thermal stability needed for the formation of a multi-layer thin film necessary in fabricating the optical devices, and thus can fabricate highly reliable optical devices.

While there have been illustrated and described what are considered to be preferred specific embodiments of the present invention, it will be understood by those skilled in the art that the present invention is not limited to the specific embodiments thereof, and various changes and modifications and equivalents may be substituted for devices thereof without departing from the true scope of the present invention.

The present disclosure relates to subject matter contained in priority Korean application no. 10-2000-0057155, filed on Sep. 28, 2000, which is herein expressly incorporated by reference in its entirety.

What is claimed is:

1. Fluorinated polyethers having a fluorinated aliphatic group at a main chain, which are represented by the following formula (1):

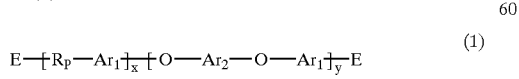

(1)

where $R_F$ represents $OCH_2(CF_2)_nCH_2O$, or $OCH_2CF_2O(CF_2CF_2O)_nCF_2CH_2O$, where n is a natural number ranging from 1 to 12;

$Ar_1$ represents

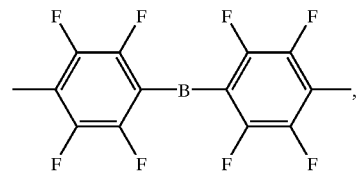

where B is not present or a C=O group, or $Ar_1$ represents

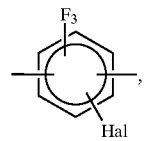

where Hal is one selected from F, Cl, Br and I;

$Ar_2$ represents

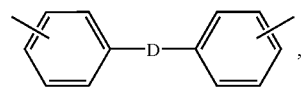

where D is one selected from —$C(CF_3)_2$, —$C(CH_3)_2$, —CO—, —$SO_2$—, —O— and —S—, or $Ar_2$ represents

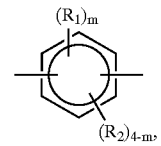

where $R_1$ and $R_2$ are the same or different and each independently represents a halogen atom selected from F, Cl, Br and I, and m is a natural number of 1–3, or $Ar_2$ represents

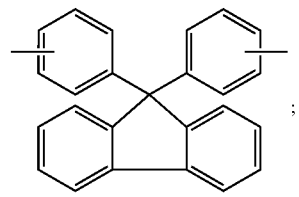

E represents H, or

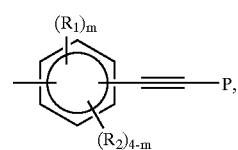

where P is H or a substituted or unsubstituted phenyl group;

x is a number ranging from 0.1 to 1.0;

y is 1.0−x.

2. The fluorinated polyethers of claim 1, which has no an ethynyl group at an end.

3. The fluorinated polyethers of claim 1, which has a thermosettable ethynylphenol or phenylethynylphenol group at an end.

4. The fluorinated polyethers of claim 1, in which $R_F$ is a perfluoroalkyl group, and $Ar_1$ is a decafluorobiphenyl group.

5. The fluorinated polyethers of claim 1, in which $R_F$ is a perfluoroethylene oxide group, and $Ar_1$ is a decafluorobiphenyl group.

6. A waveguide type optical devices comprising a lower cladding layer formed on a flat substrate, a core layer formed on the lower cladding layer, and a upper cladding layer formed on the core layer, wherein the core and/or cladding layers are formed of the fluorinated polyether derivatives of claim 1.

* * * * *